United States Patent

[11] 3,573,723

| [72] | Inventor | Dominique Michon |
| | | Paris, France |
| [21] | Appl. No. | 786,600 |
| [22] | Filed | Dec. 24, 1968 |
| [45] | Patented | Apr. 6, 1971 |
| [73] | Assignee | Compagnie Generale de Geophysique |
| | | Paris, France |
| [32] | Priority | Jan. 12, 1968 |
| [33] | | France |
| [31] | | 135736 |

[54] METHOD AND APPARATUS FOR SEISMIC PROSPECTION
2 Claims, 3 Drawing Figs.

| [52] | U.S. Cl. | 340/15.5 |
| [51] | Int. Cl. | G01v 1/00 |
| [50] | Field of Search | 340/15.5 |
| | | (GCOS) |

[56] References Cited
UNITED STATES PATENTS

| 2,364,755 | 12/1944 | Ritzmann | 340/15.5 |
| 3,376,950 | 4/1968 | Grine | 340/15.5 |

Primary Examiner—Rodney D. Bennett, Jr.
Assistant Examiner—Joseph G. Baxter
Attorney—Waters, Roditi, Schwartz & Nissen ABSTRACT: A seismic prospection system of the type resorting to a plurality of geophones or groups of geophones feeding a common recording means to obtain average figures wherein the strays are eliminated by the successive transient disconnections of the different geophones with reference to a common recording means as provided by a detector located ahead of the geophones so that the incoming strays impinging on the detector produce pulses disconnecting the successive geophones during an operative cycle.

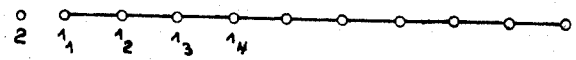
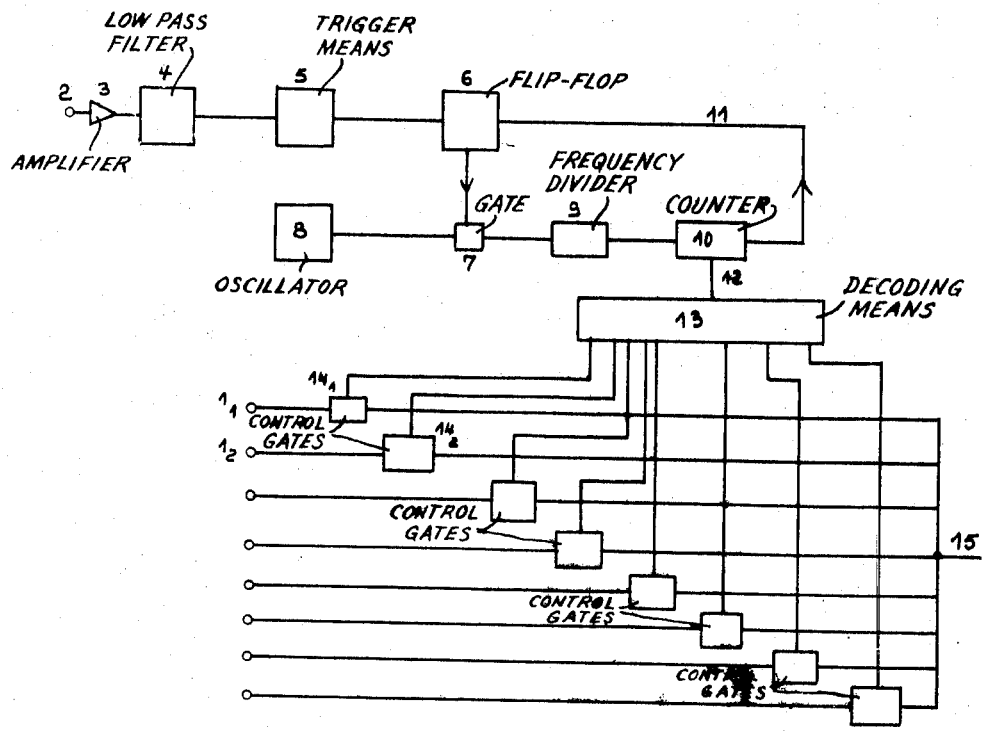

METHOD AND APPARATUS FOR SEISMIC PROSPECTION

The present invention has for its object an improved method and means for seismic prospection, chiefly as concerns seismic reflection, that is the recording of waves produced at ground level at a reduced depth or in water and returned by the discontinuous ground surfaces to be investigated into geophones located at or near ground level.

This result is generally achieved by providing at a certain distance from the point where the seismic waves are produced a number of geophones or sound detectors aligned for instance in spaced relationship, the different geophones being connected in parallel and the sum of the currents passing out of geophones producing a signal recorded as a seismic graph.

The use of several geophones or sound detectors is essential since it is necessary to provide average figures and this does not lead to any drawback since the reflected waves reach practically in a simultaneous manner the different geophones cooperating in the recording of the common graph.

Experience shows that the geophones permanently connected in such a manner do not record solely the useful reflected waves, but also a number of strays which is detrimental to the grade of the record.

Applicant has found that many of these strays are propagated horizontally, either through the atmosphere or else in the upper ground layers or again through water.

Investigation has shown that such stray vibrations are somewhat similar to comparatively short wave trains propagated horizontally at a constant speed and consequently said wave trains act in succession upon the different geophones adapted to generate a graph and energize them during a time interval of which is much shorter than that required for the stray wave to progress from the first geophone associated with the graph to the last geophone associated with said graph.

The present invention has for its object to eliminate the influence of such strays and this is achieved by disconnecting transiently and in succession the different geophones associated with the same graph as soon as it is reached by the stray and throughout its passage, the geophone being reconnected as soon as the stray has passed beyond it.

To this end, a vibration detector such as a microphone is associated with each system of geophones or groups of geophones adapted to record a predetermined graph, said detector being located at the end of the system of aligned geophones or groups of geophones to be considered, which end faces the source of strays. The speed and duration of the wave trains are estimated before operation or else ascertained and the apparatus is adjusted correspondingly so that their operation is automatic since the detector registers the arrival of the stray and produces immediately the inoperativeness and then the return to operativeness of each geophone or group of geophones adapted to produce the graph at a moment defined for each geophone or group of geophones by its location in the series of aligned geophones.

In the accompanying drawings:

FIG. 1 illustrates a series of aligned geophones.

FIG. 2 is a wiring diagram illustrating the arrangement provided in accordance with the invention.

Figure 3:
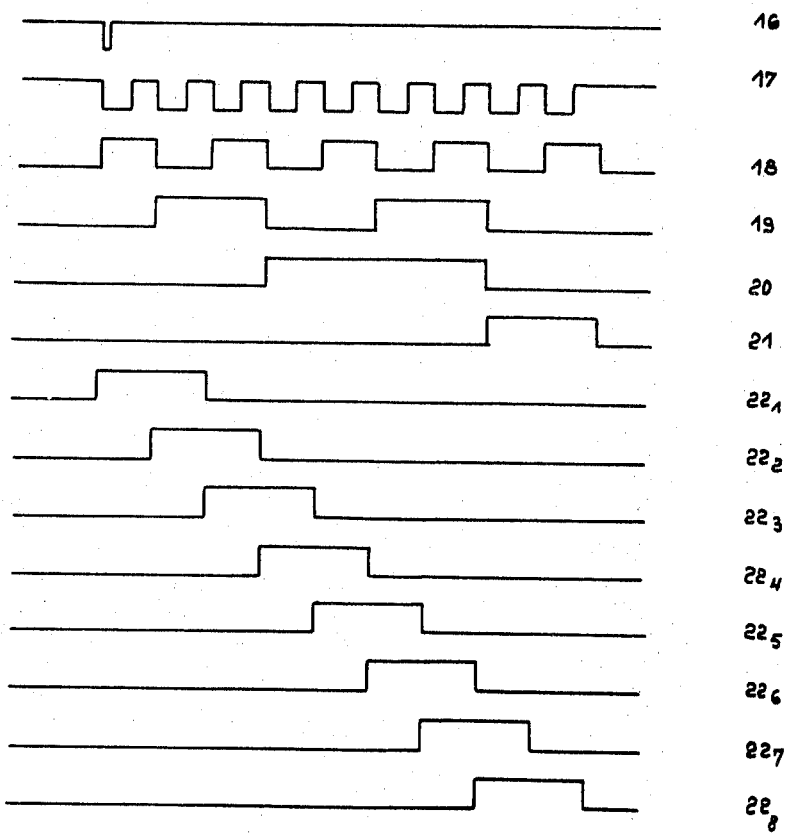
FIG. 3 is a graph illustrating the operation of the different geophones and their automatic connections and disconnections with reference to time.

As illustrated diagrammatically in FIG. 1, the geophones $1_1, 1_2, 1,...$ are arranged in uniformly spaced relationship along a straight line in order to cooperate in the recording of a common seismic graph. Said geophones are connected for instance in parallel with the recording means.

In conformity with the invention, there is provided at the upstream end of the alignment of geophones, that is at a point through which the incoming strays enter the geophone system, a microphone or the like detector 2. The signals received by said detectors are employed to cut off and reinsert, in succession, the different geophones in the circuit system.

It has been assumed in FIG. 2, given as a merely illustrative and by no means limiting example, that the detector 2 is located ahead of eight geophones. The signal received by said detector is amplified by the amplifier 3 and is fed through a low-pass filter 4 which cuts out noise. The filtered signal then enters a trigger or releasing means 5 transforming said filtered signal into a pulse adapted to operate a flip-flop 6 defining the beginning and end of a cycle. The output of said flip-flop controls a gate 7 controlling in its turn the output of the oscillator 8. Said oscillator is of a variable frequency type and defines the time interval during which each geophone is to remain inoperative, said time interval being the same for all the geophones. Said oscillator supplies square signals through the gate 7 when the latter is open to a frequency divider 9 dividing the frequency of the signals from the oscillator by 16. If, for instance, the frequency fed by the oscillator 8 is equal to 800 cycles, the frequency of the square signals at the output of divider frequency divider is equal to 50 cycles. The signals at a divided frequency are then fed to a four-stage counter 10. Each stage of the counter 10 forms also a frequency divider providing a division of frequency by 2. The last stage of the counter 10 defines, when it is actuated, the end of an operative cycle. This end of the cycle produces through the lead 11 a return of the flip-flop 6 into its original condition. The four stages of the counter 10 control through the lead 12 decoding means 13 of a well-known type and these decoding means control gates such as $14_1, 14_2, 14_3,...$ inserted between the corresponding geophones and the common lead 15 feeding the recording means.

The graphs of FIG. 3 illustrate the operation of the arrangement. The square pulses at the output of 9 are illustrated at 17 whereas 16 shows the narrow pulse fed by the flip-flop 6 at the beginning of the cycle. The first stage of the counter 10 supplies square pulses 18 at a frequency which is one-half that of the pulses. 19 designates the pulses at the output of the second stage, 20 those at the output of the third stage and 21 those at the output of the fourth stage. In contradistinction with the first two stages, the square pulse at the output of the fourth stage has for its object to define the end of the cycle and the duration of each of these is equal to that of the pulses passing out of the second stage. The signals at the output of the decoding means 13 are illustrated at $22_1$ for the first geophone at $22_2$ for the second geophone and so on up to the last geophone $22_8$.

The arrangement is such that one geophone remains disconnected throughout the duration of the square pulse reaching its gate. It is apparent that the geophone $1_1$ is the first one to be disconnected, its disconnection being provided at the very beginning of the cycle; the geophone $1_2$ is the next one to be disconnected while $1_1$ is still disconnected. The following geophones are disconnected in a similar sequence. There is thus obtained a sort of overlapping by one-half of successive periods of disconnection. In the example disclosed, there are always two geophones disconnected at any moment, except for the first half of the disconnection of the first geophone and for the last half of the disconnection of the last geophone.

It should be noted that FIGS. 2 and 3 illustrate only a particular embodiment of the invention which is obviously independent of the method, whether electronic or otherwise, provided for the transient disconnection of the geophones. It should also be noted that the frequency of the signals produced by the oscillator 8, or the like supply, is selected so as to be high enough for the indetermination ascribable to the lack of coincidence in time between the pulse supplied by the flip-flop 6 and the beginning of a signal passing out of the oscillator 8 to be incapable of leading to unallowable errors.

Experience shows that the incorporation of the invention with a seismic recording system leads to a clear improvement in the accuracy of the records obtained.

It seems unnecessary to describe the decoding means 13 which are well known per se and include solely gates and logical AND and OR systems.

I claim:
1. In a seismic prospection method having a plurality of spaced aligned geophones and a common seismic recording means fed in parallel by said geophones, the steps comprising disconnecting transiently and in succession the different geophones during a succession of cycles to eliminate the effects of stray waves passing through the aligned geophones, controlling said disconnection by the arrival of stray waves at said plurality of geophones, and detecting the stray wave ahead of the aligned geophones and causing them to produce pulses adapted to ensure the transient successive disconnections of the geophones with an overlapping in time of the successive disconnections.

2. In a seismic prospection system, the combination of a plurality of spaced aligned geophones, common recording means, means connecting said geophones in parallel with the common recording means, means adapted to transiently disconnect, in succession throughout a cycle, the different geophones with reference to said common recording means, stray detector means controlling said means adapted to transiently disconnect geophones, said disconnecting means including a detector of stray waves located ahead of the geophones, a pulse generator connected to said detector, means whereby said pulse generator produces the transient disconnections of the successive geophones and a multivibrator controlled by said detector and defining the beginning and end of each cycle of disconnections.